(No Model.)
G. A. GUMPHERT.
VISE.
No. 561,663.          Patented June 9, 1896.
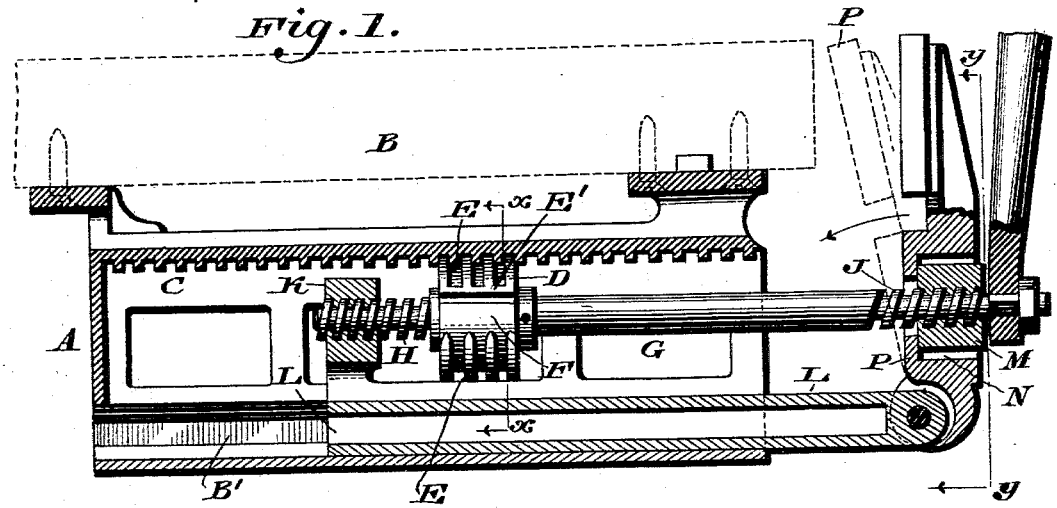
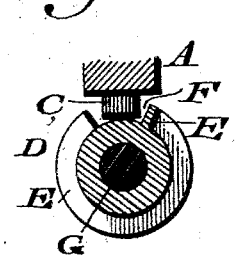
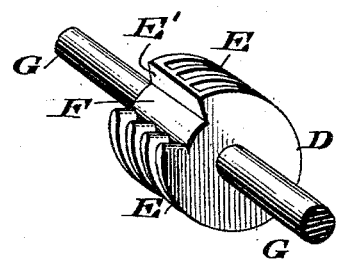
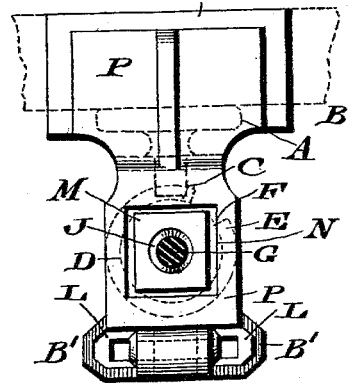
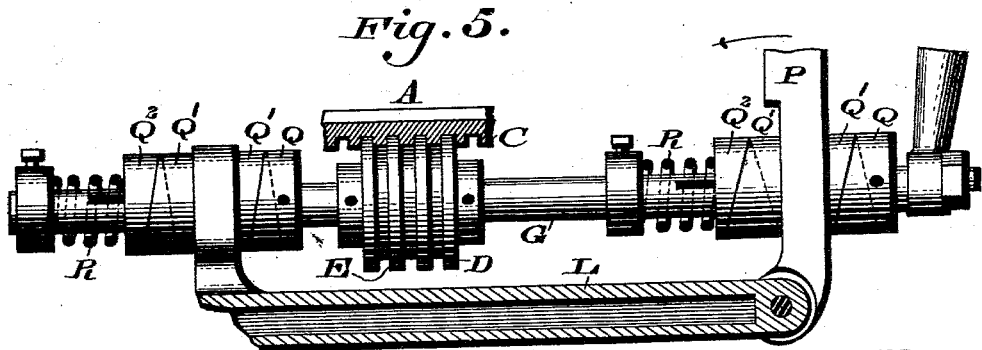
WITNESSES:
P. H. Aagle.
L. Douville.
INVENTOR
George A. Gumphert
BY John A. Wiederoheim
ATTORNEY.

UNITED STATES PATENT OFFICE.

GEORGE A. GUMPHERT, OF PHILADELPHIA, PENNSYLVANIA, ASSIGNOR OF ONE-HALF TO GEORGE W. H. FAWKES, OF SAME PLACE.

VISE.

SPECIFICATION forming part of Letters Patent No. 561,663, dated June 9, 1896.

Application filed April 11, 1895. Serial No. 545,358. (No model.)

*To all whom it may concern:*

Be it known that I, GEORGE A. GUMPHERT, a citizen of the United States, residing in the city and county of Philadelphia, State of Pennsylvania, have invented a new and useful Improvement in Vises, which improvement is fully set forth in the following specification and accompanying drawings.

My invention consists of an improvement in vises formed of a jaw pivoted to a slide and a screw with different pitches of threads engaging said jaw and slide, together with means for primarily adjusting the jaw, whereby an effective and powerfully-acting vise is produced, as will be hereinafter set forth.

Figure 1 represents a partial side elevation and partial vertical section of a vise embodying my invention. Fig. 2 represents a segmental vertical section on line $x\,x$, Fig. 1. Fig. 3 represents a perspective view of a detached portion thereof, the threads on the spindle in said portion being omitted. Fig. 4 represents a partial end elevation and partial vertical section on line $y\,y$, Fig. 1. Fig. 5 represents a partial side elevation and partial vertical section of a modification.

Similar letters of reference indicate corresponding parts in the several figures.

Referring to the drawings, A designates a frame of a vise, which is secured in any suitable manner to a work-bench B, and provided with a rack C and a guide B', in which latter is fitted a slide L, which is provided at one end with an ear K and has at the other end the jaw P, pivoted thereto.

G designates a spindle which has screw-threads H and J at the ends thereof, the threads H being fitted to the ear K and the other threads J being fitted in a nut M, which latter freely occupies an angular opening N in said jaw, it being noticed that said threads have different pitches. Secured to said spindle G is a collar D, having circumferential teeth E and a longitudinally-extending groove F on the circumference, the teeth E thereof engaging with the teeth of the rack C for locking the spindle with the frame of the vise.

It will be noticed that the teeth E are connected at one end by the wall E' of the groove F, the same being adapted to abut against the teeth of the rack C, with which the said teeth E engage, thus providing a stop which limits the rotation of the collar D, while the other ends of said teeth E are free to enter the rack-teeth when said collar is properly rotated.

The collar D is primarily applied to the rack C, the groove F permitting it to be placed at an adjusted position thereon relative to the comparative size of the article to be held by the vise. The article is then located between the jaw and bench, the latter also serving as a jaw. The spindle is now turned so that the teeth E engage with those of the rack C as a connection for the spindle with said rack, it being noticed that said collar forms a swivel for the spindle, whereby the latter is permitted to rotate without moving in longitudinal direction. The spindle is then rotated and the ear K advances, and with it the slide L and jaw P, it being noticed that said jaw P is now closed against the article first by longitudinal motion and then by radial motion, due to the pivotal connection of the jaw with the slide and the different pitches of the screws or screw-spindle.

In lieu of the threads on the spindle I may employ cams Q Q', as shown in Fig. 5. The cams Q' are secured to the jaw P and the ears K, respectively, and have the spindle G passed freely through the same. The cams Q are secured to said spindle so as to rotate therewith, and thus impart motion to said jaws similar to the action of the screw-threads shown in the other figures. On the spindle are also the cams $Q^2$, which are connected with the same by feathers, which permit said cams to slide on the spindle and also to rotate therewith. Springs R bear against said cams $Q^2$ in order to return the jaw to its normal or upright position, it being evident that when the spindle is turned the cams Q press against the cams Q' and thus cause the jaw P to close tightly against the object that is to be gripped, it being also noticed that the pitch of the cams on the right is coarser than that on the left, but the action is similar to that of the screws J and H.

Having thus described my invention, what I claim as new, and desire to secure by Letters Patent, is—

1. In a vise, a slide carrying one of the jaws thereof, a frame having a rack, a screw engaged with said slide and jaw, and a toothed collar adapted to engage with said rack and form a swivel for said screw, substantially as described.

2. In a vise, a toothed collar engaging with a rack on the frame of the vise, and a screw-spindle fitted to one of the jaws of the vise and secured in said collar, the latter having a longitudinally-extending groove for the passage of the rack in primarily adjusting the jaw, said parts being combined substantially as described.

3. In a vise, a frame with a rack, and a guide, a movable slide in said guide having a pivoted jaw on its end, a spindle mounted on said slide having threads of different pitch, said threads respectively engaging an ear on said frame, and a non-rotatable nut held in the pivoted jaw and a collar secured to said spindle, having peripheral teeth engaging said rack, said parts being combined substantially as described.

4. A vise consisting of a frame, provided with a rack and a guide, a slide in said guide, having an ear on one end and a pivoted jaw on the other end, a non-rotatable nut, in an opening in said jaw, a spindle with threads of different pitch, said threads engaging said ear and nut respectively, and a collar secured to said spindle and having peripheral teeth engaging said rack, said collar having a longitudinal groove on its outer face, said parts being combined substantially as described.

5. A vise having a slide, a jaw pivotally connected with said slide, a screw engaging said slide and jaw, the pitches of said screw being different at said slide and jaw, a rack and a collar adapted to engage with said rack and form a swivel for said screw substantially as described.

6. A frame and a slide on said frame, in combination with a jaw which is pivoted on said slide, a screw-spindle for said slide and pivotal jaw, and means for forming a swivel connected with said frame for said spindle, the latter having its threads, where engaging with said jaw and slide, of different pitches, substantially as and for the purpose set forth.

GEORGE A. GUMPHERT.

Witnesses:
JOHN A. WIEDERSHEIM,
A. P. JENNINGS.